(12) United States Patent
Murayama

(10) Patent No.: US 7,664,487 B2
(45) Date of Patent: Feb. 16, 2010

(54) MOBILE TERMINAL AND METHOD OF MANAGING DATA RECEPTION USING THE MOBILE TERMINAL

(75) Inventor: Noriyuki Murayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 268 days.

(21) Appl. No.: 10/969,602

(22) Filed: Oct. 20, 2004

(65) Prior Publication Data
US 2005/0090282 A1    Apr. 28, 2005

(30) Foreign Application Priority Data
Oct. 23, 2003    (JP)    ............... 2003-363918

(51) Int. Cl.
H04L 12/58    (2006.01)
H04M 1/725    (2006.01)

(52) U.S. Cl. ............. 455/412.1; 455/558; 455/556.1; 455/412.2; 455/413; 455/411

(58) Field of Classification Search ............... 455/558, 455/556.1, 412.1, 411
See application file for complete search history.

(56) References Cited

U.S. PATENT DOCUMENTS

| 5,687,216 A * | 11/1997 | Svensson | 455/412.2 |
| 5,875,404 A * | 2/1999 | Messiet | 455/558 |
| 6,011,976 A * | 1/2000 | Michaels et al. | 455/466 |
| 6,055,442 A * | 4/2000 | Dietrich | 455/558 |
| 6,097,967 A * | 8/2000 | Hubbe et al. | 455/558 |
| 6,216,015 B1 * | 4/2001 | Hymel | 455/558 |
| 6,278,885 B1 * | 8/2001 | Hubbe et al. | 455/558 |
| 6,343,214 B1 * | 1/2002 | Holmes | 455/411 |
| 6,463,300 B1 * | 10/2002 | Oshima | 455/558 |
| 6,807,411 B1 * | 10/2004 | De Kermadec | 455/412.1 |
| 7,353,015 B1 * | 4/2008 | Tenhunen | 455/412.2 |

FOREIGN PATENT DOCUMENTS

| FI | 109746 B1 | 9/2002 |
| JP | 08-009017 | 1/1996 |
| JP | 11046245 A | 2/1999 |
| JP | 11154121 A | 6/1999 |
| JP | 2001-156904 | 6/2001 |
| JP | 2003289347 A | 10/2003 |

* cited by examiner

Primary Examiner—Lana N Le
Assistant Examiner—Ping Y Hsieh
(74) Attorney, Agent, or Firm—Hogan & Hartson LLP

(57) ABSTRACT

In sending an e-mail to the mobile phone, the e-mail is first sent to the server apparatus. After the server apparatus identifies the sender, it sends a mail presence notice (MPN) to the mobile phone. When receiving the MPN, the mobile phone memorizes a mail ID included in the MPN in association with user identification of a SIM card. Then, the mobile phone sends a request for header data to the server apparatus based on the mail ID. When receiving the header data completely sent from the server apparatus upon the request, the mobile phone deletes the mail ID which it has memorized in association with the user identification data.

12 Claims, 9 Drawing Sheets

FIG. 2

|   | USER IDENTIFICATION DATA | MAIL ID |
|---|---|---|
| 1 | 01234 | ID2000 |
| 2 | 32495 | ID3001 |
| 3 | 65438 | ID5006 |
| ⋮ | ⋮ | ⋮ |
| N | 24798 | ID7002 |

MOBILE TERMINAL AND METHOD OF MANAGING DATA RECEPTION USING THE MOBILE TERMINAL

BACKGROUND OF THE INVENTION

1. Field of the Invention

The present invention relates to a mobile terminal having an input means for inputting identification data for identifying a user, for example, a mobile terminal such as a mobile phone, etc. having an interface for an attachable and detachable recording media for storing the identification data, and to a method of managing data reception using the mobile terminal.

2. Description of the Related Art

Among mobile phones with GSM system (Global system for mobile communications), there is one which obtains an identification number or a phone number of a subscriber from an exchangeable IC card named as SIM (subscriber identity module) card. When using such a mobile phone, based on the information read from the SIM card, it is authenticated that the user of the mobile phone is an official subscriber registered by a communication enterpriser. UIM (user identity module), which is SIM-based, has a similar function to that of the above mentioned SIM card.

Insertion of different SIM cards to a mobile phone makes it possible to change the phone number of the mobile phone. Consequently, it becomes possible to share the mobile phone among a plurality of users, and use a plurality of mobile phones with a single phone number. In addition to such information for identifying a user, the SIM card can store personal information for the user such as a phone book or bill information.

It is disclosed, in Japanese Unexamined Patent Application No.2001-156904, a technique for managing personal information with the above SIM card by memorizing a phone book for a respective user in an exchangeable recording media such as the SIM card.

A telephone disclosed in Japanese Unexamined Patent Application No.2001-156904 has recording areas corresponding to the attached recording media, each of which stores a phone book when the corresponding recording media is attached.

However, according to the above technique, the management for personal information is only to expand personal information for a respective user, and does not provide a concept in which a SIM card is applied for management of reception of wireless communication data, etc.

Particularly, as mentioned above, with a mobile phone with GSM system, a plurality of users can share the mobile phone by exchanging a SIM card allocated to a respective user. So, it is demanded that reception to the plurality of users should be managed properly.

For example, suppose a case in which, while a specific user of a mobile phone does not complete reception of an e-mail, etc. to the specific user, the SIM card attached to the mobile phone is exchanged for a use of the another user, and afterwards the specific user starts reusing the mobile phone by attaching the SIM card. In this case, it is demanded that the incomplete reception of the e-mail in the previous use of the specific user should be completed more reliably and timely.

SUMMARY OF THE INVENTION

An object of the present invention is to provide a mobile terminal enabling the reception of e-mails more reliably and timely.

To attain the object, there is provided a mobile terminal comprising an exchangeable recording media for recording user identification data for a user, a wireless communication unit for connecting a network, a memory unit for storing communication status data standing for a presence of unreceived communication data in association with the user identification data, and a control unit for recognizing a presence of communication data to the user in the network via the wireless communication unit, recording the communication status data in the memory unit, generating a request to the network for receiving the communication data when the communication status data are present in association with the user identification data recorded in the recording media, and deleting the communication status data from the memory unit after the completion of the reception of the communication data upon the request.

Preferably, the control unit starts accessing to the memory unit when the wireless communication becomes possible, and checks if the communication status data are present in association with the user identification data recorded in the recording media.

Preferably, the control unit starts accessing to the memory unit when receiving a notice from the network, the notice standing for a presence of the communication data to the user, and checks if the communication status data are present in association with the user identification data recorded in the recording media.

Preferably, the recording media is a SIM card or a UIM card.

To attain the object, there is provided a method of managing data reception using a mobile terminal that has an exchangeable recording media for recording user identification data for a user, comprising the steps of recognizing, by wireless communication, a presence of communication data to the user in a network, recording communication status data standing for a presence of unreceived communication data in association with the user identification data, generating a request to the network for receiving the communication data when communication status data are present in association with the user identification data recorded in the recording media, and deleting the communication status data after the completion of the reception of the communication data upon the request.

Preferably, the method further comprises steps of, in generating the request, starting accessing to the memory unit when the wireless communication becomes possible, and checking if the communication status data are present in association with the user identification data recorded in said recording media.

Preferably, the method further comprises steps of, in generating the request, starting accessing to the memory unit when receiving a notice from the network, the notice standing for a presence of the communication data to said user, and checking if the communication status data are present in association with the user identification data recorded in said recording media.

Preferably, the recording media is a SIM card or a UIM card.

BRIEF DESCRIPTION OF THE DRAWINGS

These and other objects and features of the present invention will be described in more detail with reference to the accompanying drawings, in which:

FIG. 2 is a view for showing an example of a communication status list;

DESCRIPTION OF THE PREFERRED EMBODIMENTS

Below, a mobile phone, as an embodiment of a mobile terminal according to the present invention, will be explained in association with the attached drawings.

Figure 1:
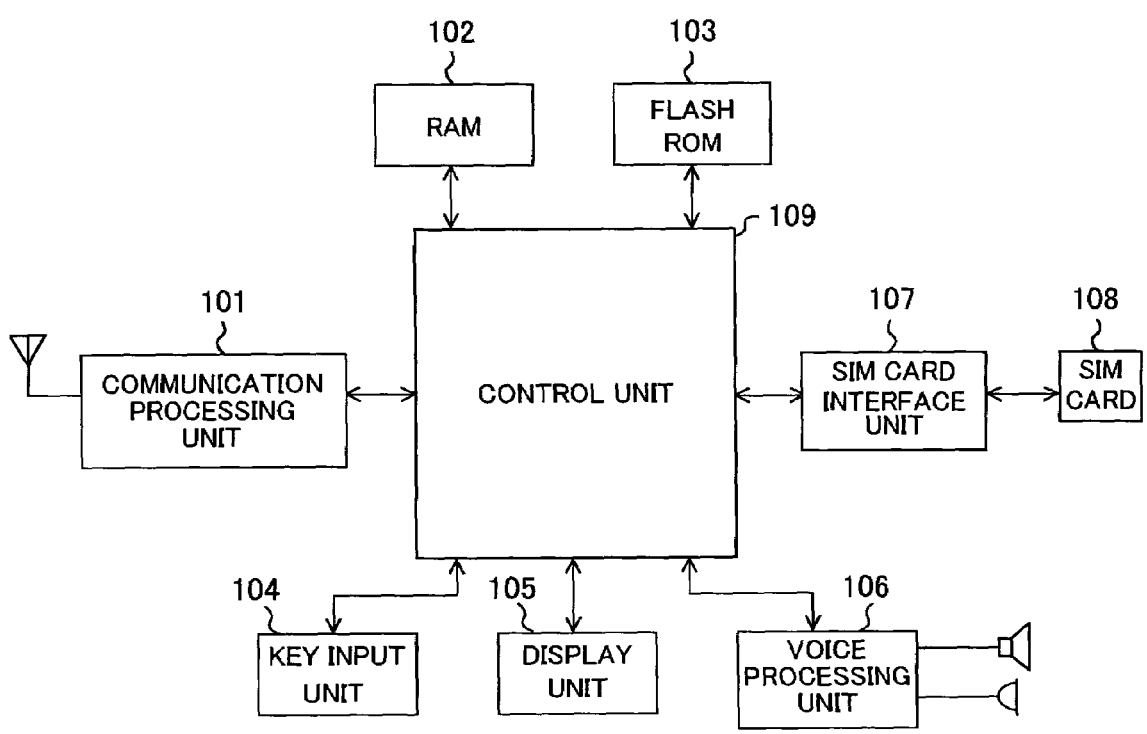
FIG. 1 is a block diagram illustrating an example of a system configuration of a mobile phone according to the present embodiment.

FIG. 1 is a block diagram for illustrating an example of a system configuration of a mobile phone 10 according to the present embodiment.

The mobile phone 10 has, as shown in FIG. 1, a communication processing unit 101 as a wireless communication unit, a RAM 102, a flash ROM 103 as a memory unit, a key input unit 104, a display unit 105, a voice processing unit 106, a SIM card interface unit 107, a SIM card 108, and a control unit 109 as a control unit.

Note that, as will be mentioned later, the SIM card 108 is a card-type recording media which is exchangeable via the corresponding slot.

The communication processing unit 101 encodes a variety of data such as voice data and e-mails, etc. which are processed by the control unit 109, and sends the same to a base station via an antenna.

The communication processing unit 101 decodes a variety of data such as voice data and e-mails, etc. which are sent from the base station by a wireless communication and received via the antenna, and outputs the same to the control unit 109.

The RAM 102, which is configured including a volatile memory, memorizes user-specific information, for example, user identification data, a phone number, etc.

Namely, when the SIM card 108 is attached to the mobile phone 10, the control unit 109 accesses the attached SIM card 108 via the SIM card interface unit 107, reads out user identification data, a phone number, etc. and stores the same in the RAM 102.

The flash ROM 103, which is configured including a non-volatile memory, memorizes control programs for sending/receiving phone calls and e-mails, an internet browser, message data, an address book in which names and phone numbers are registered, etc. Further, in the present embodiment, the flash ROM 103 memorizes a communication status list (CSL).

The communication status list (CSL) is data which relates mail ID (mail-specific ID managed by a server apparatus) of mails which the server apparatus has received and the mobile phone 10 has not yet received, to the corresponding user identification data. The CSL is an embodiment of the communication status data according to the present invention.

FIG. 2 is a drawing for showing an example of a CSL. In FIG. 2, a CSL is shown by an example of 5 digits code. The mail ID, as will be later mentioned, is included in a mail presence notice (MPN) which is sent to a recipient of an e-mail after a server apparatus receives the e-mail.

Further, as will be later mentioned, based on the MPN, the mobile phone 10 sends a request to a server apparatus for receiving the header part of the corresponding e-mail, and stores the corresponding mail ID in the CSL until the completion of the reception of the header part.

The key input unit 104 has a plurality of keys corresponding to an on-hook key, an off-hook key, numeric keys, etc. By an operation to these keys by a user, the key input unit 104 outputs data from the user to the control unit 109.

The display unit 105 has a display device such as a LCD, etc. It displays phone numbers inputted for a communication, a variety of messages, text data, etc.

The voice processing unit 106 has a voice processing circuit to which a microphone (not shown) for inputting a voice for communication and a speaker (not shown) for outputting a voice are connected.

The voice processing unit 106 performs a predetermined processing on a voice captured by the microphone, and provides the same to the control unit 109.

The voice processing unit 106 performs a predetermined processing on voice data provided by the control unit 109, and outputs the same via the speaker.

The SIM card interface unit 107 is a communication interface between the SIM card 108 and the control unit 109. The control unit 109 accesses to the SIM card 108 via the SIM card interface unit 107.

The SIM card 108, which is configured including an EEPROM for example, is a card-type recording media which is exchangeable via the corresponding slot. It memorizes user identification data which is allocated by a user-specific number (15 digits number for example), and user-specific information such as a phone number.

The mobile phone 10 according to the present embodiment is designed so that it switches off a power when the SIM card 108 is detached. Therefore, after exchanging the SIM card 108, it is necessary for a user to switches on a power by operating the key input unit 104.

The control unit 109, which is configured including a micro computer as a main part, performs entire control of the mobile phone 10. For example, the control unit 109 performs the control of the communication processing unit 101 in sending/receiving a variety of information by wireless communication, the control of the voice processing unit 106 in processing voice data, the control of the display unit 105 in displaying data, processing the inputted data by the key input unit 104, and the access control to processing to the SIM card 108 via the flash ROM 103 and the SIM card interface unit 107.

When the SIM card 108 is attached to the mobile phone 10, the control unit 109 reads out the information in the above SIM card 108 via the SIM card interface unit 107 and stores the same in the RAM 102. This allows the mobile phone 10 to perform, with a high speed, a processing of user authentication, etc. for user identification data and a phone number which the attached SIM card 108 memorizes, and to receive wireless communication data to the user.

In the present embodiment, the control unit 109 accesses the above communication status list (CSL), and if a corresponding mail ID is present for user identification data which the SIM card 108 attached to the mobile phone 10 memorizes, the control 109 requests a server apparatus to send the header data by controlling the communication processing unit 101. When the control 109 completes the reception of the header data, it deletes the corresponding mail ID form the CSL.

Next, the operation of control unit 109 will be explained in association with a flowchart in FIG. 3.

Figure 3:
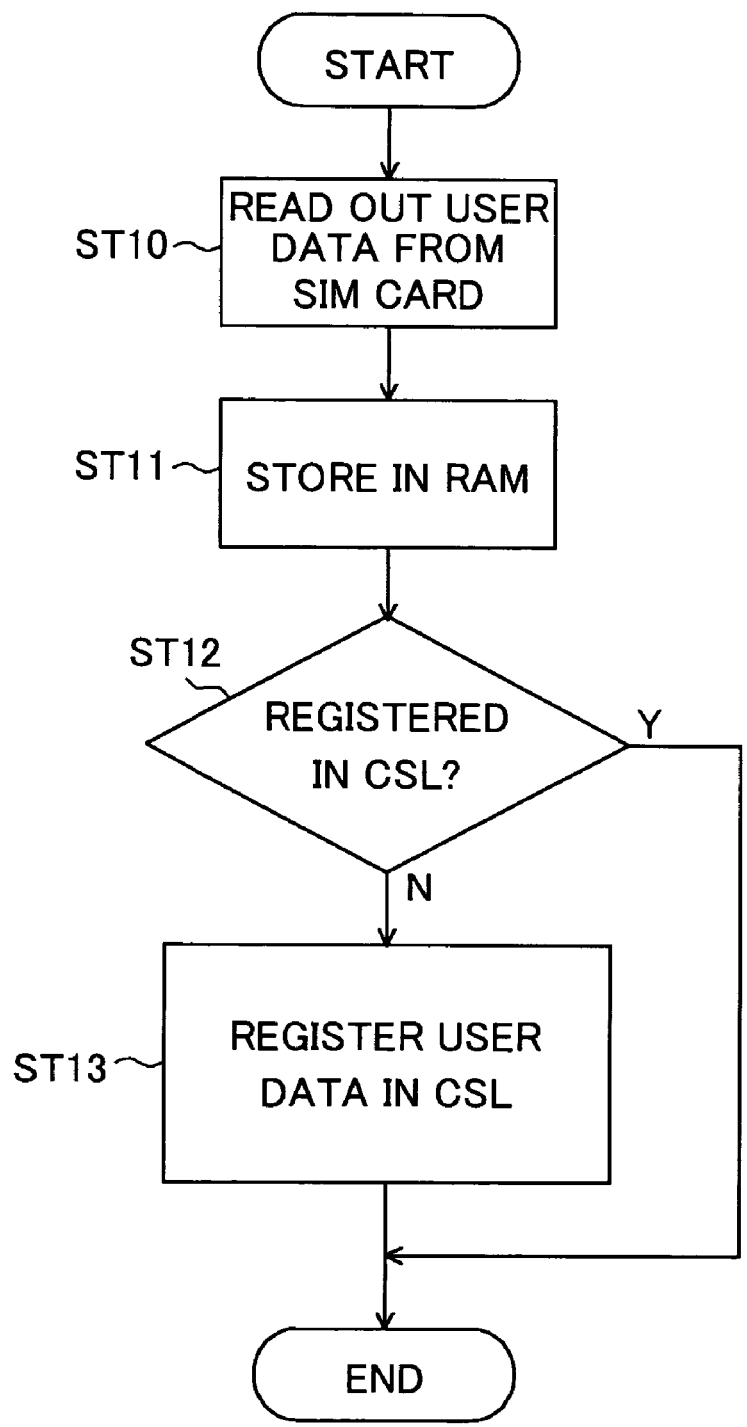
FIG. 3 is a flowchart for registering user identification data to a communication data list.

Time when the control unit 109 performs the operation shown by the flowchart in FIG. 3 may be in a period for initial processing at a startup of a power. At this time, since the mobile phone 10 according to the present embodiment is designed so that it switches off a power when the SIM card 108 is detached, the flowchart in FIG. 3 should be always performed if the SIM card 108 is detached.

For example, if operation of the flowchart in FIG. 3 starts during the startup, the control unit 109 may start accessing, via the SIM card interface unit 107, the EEPROM in the SIM card 108 attached to the mobile phone 10, and read out user data such as user identification data or a phone number, etc (step ST10).

User data including the user identification data, which is read out from the SIM card 108, will be stored in the RAM 102 (step ST11). Due to this, the control unit 109 does not need to access to the SIM card 108 again as long as the power is ON, which allows a high speed access to the user identification data.

Further, the control unit 109 checks if the user identification data stored in the RAM 102 is registered in the communication status list (CSL) in the flash ROM 103. If not registered, the user identification data stored in the RAM 102 will be registered in the CSL.

As described above, when the SIM card 108 is attached to the corresponding slot of the mobile phone 10, the user identification data of the SIM card 108 is registered in the CSL.

Next, an operation for receiving an e-mail in the mobile phone 10 will be explained in association with FIG. 4 and FIG. 5.

Figure 4:
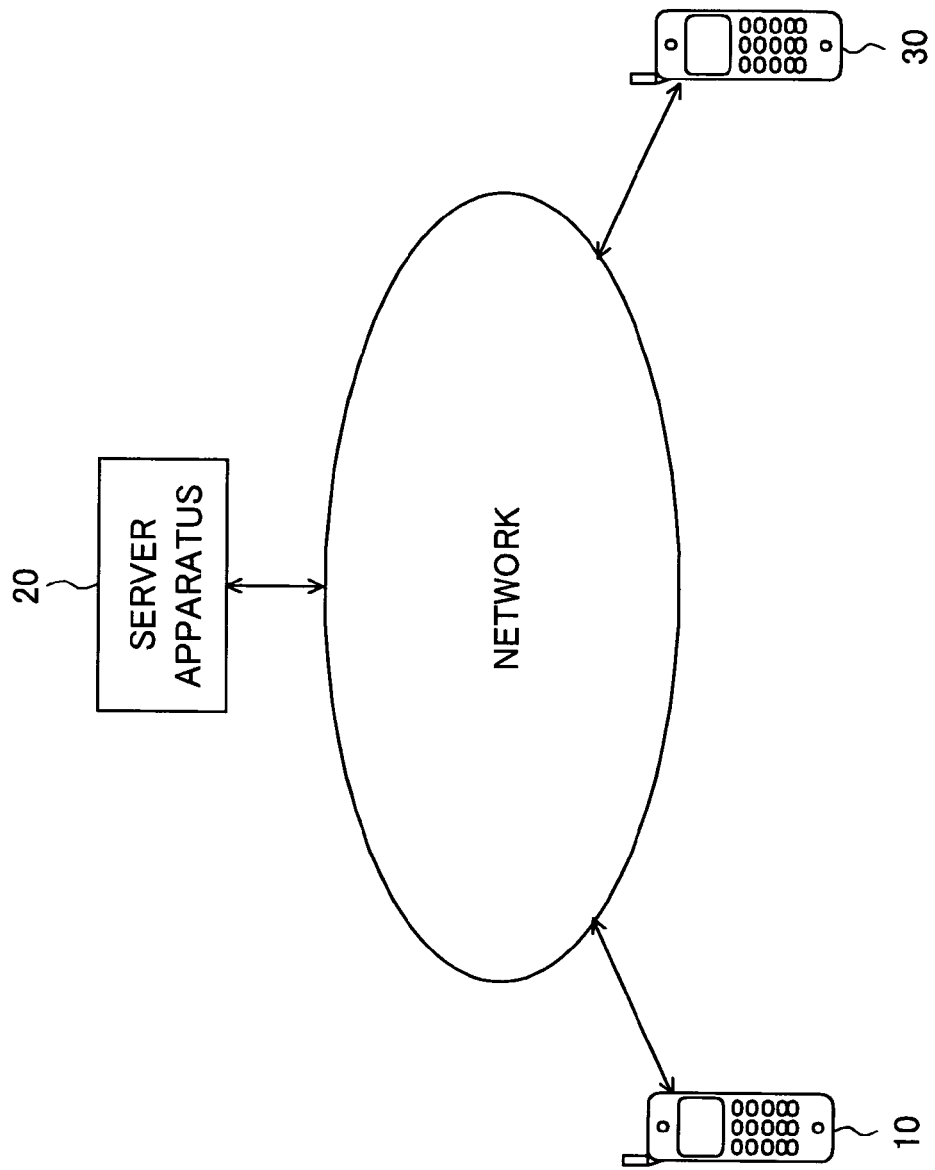
FIG. 4 is a view illustrating reception environment for a mobile phone according to the present embodiment.

FIG. 4 shows a connection environment in which the mobile phone 10 receives an e-mail from the other mobile phone 30. The mobile phone 10 may also receive an e-mail from a personal computer (not shown), etc.

As shown in FIG. 4, the mobile phone 10, 30 and the server apparatus 20 are connected to a network including base station. When an e-mail is sent from the mobile phone 30 based on the mail address, is, the server apparatus 20 receives the mail via the network, and then the mobile phone 10 receives the mail from the server apparatus via the network.

Figure 5:
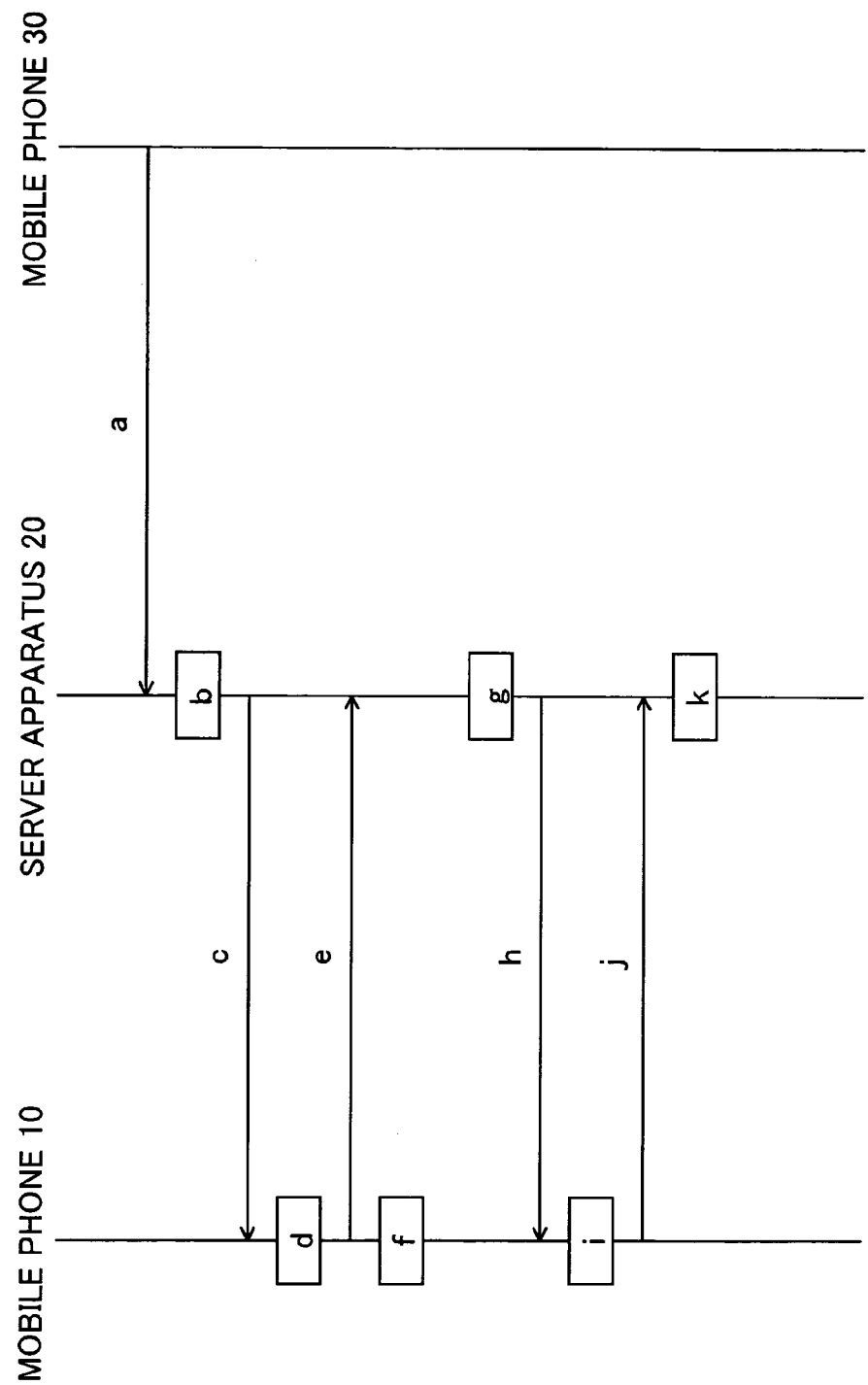
FIG. 5 is a view for describing reception operation of a mobile phone according to the present embodiment.

FIG. 5 is a drawing for describing an operation of the mobile phone 10 in receiving an e-mail from the mobile phone 30 via the server apparatus 20.

Below, the reception operation of the mobile phone 10 according to the present embodiment will be explained in association with FIG. 5.

Step a:

If the mobile phone 30 sends an e-mail to the user for the SIM card 108 attached to the mobile phone 10, the server apparatus 20 receives the e-mail via the network as shown in FIG. 4.

Step b:

When receiving the e-mail sent from the mobile phone 30, the server apparatus 20 accesses to a mail management file (MMF) for a respective registered user, and stores the e-mail in the corresponding MMF.

Figure 6:
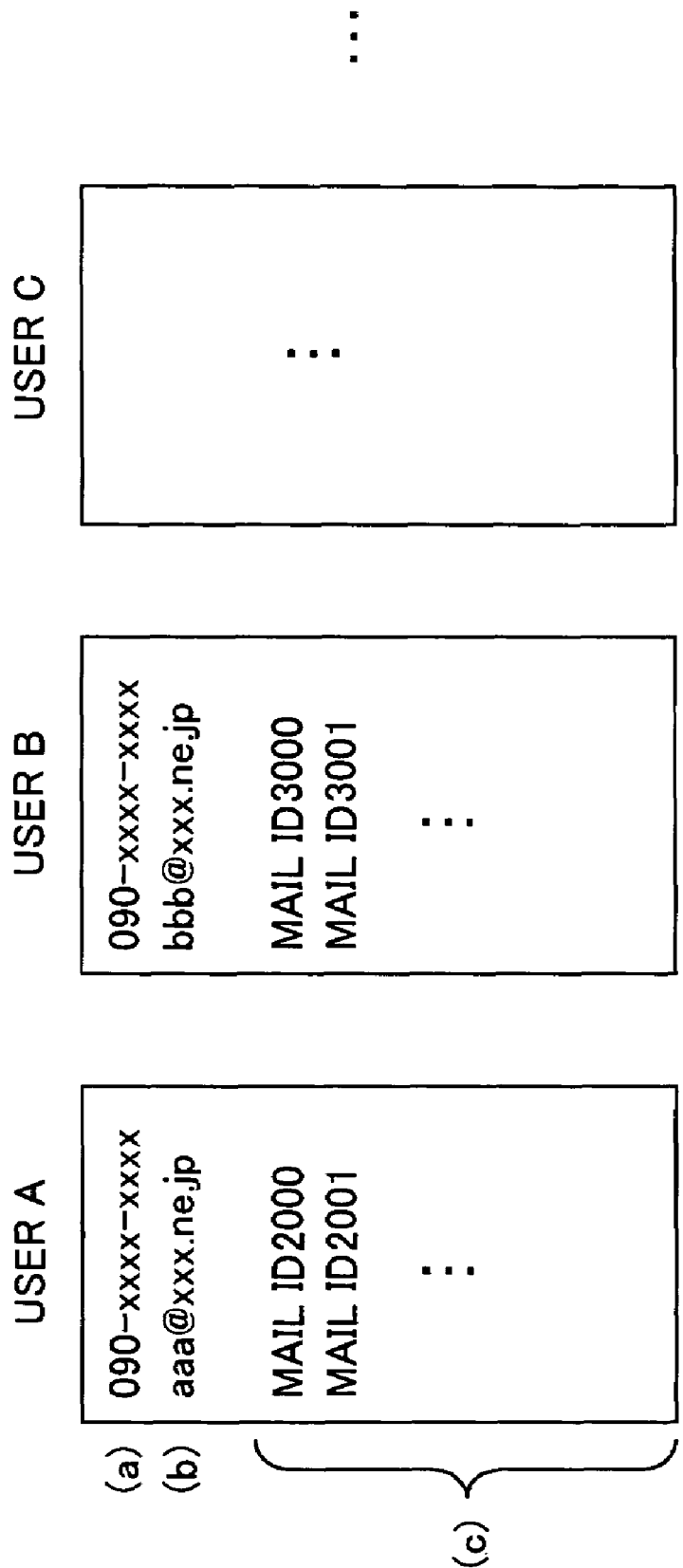
FIG. 6 is a view illustrating a mail management file for a respective user managed by a server apparatus.

FIG. 6 is a drawing which shows an example of a mail management file for each user, in which (a) shows a phone number registered for a respective user, (b) shows a mail address registered for a respective user, and (c) shows a mail ID of an e-mail sent to a respective user.

E-mails sent to a respective user are accumulated in the corresponding MMF for the user.

If the server apparatus 20 receives an e-mail sent to a respective user, it stores the e-mail in the corresponding MMF for the user. For example, in FIG. 6, if the server apparatus 20 receives an e-mail (mail ID: 2001) for user_A, it stores the text data (header data including a receiver/sender, and a text) of the e-mail in the MMF corresponding to user_A.

Step c:

Then, the server apparatus 20 sends a mail presence notice. (MPN), which indicates that it receives a new e-mail, to the mail address for the corresponding registered user. For example, in FIG. 6, the server apparatus 20 sends a MPN for the e-mail (mail ID: 2001) to the registered mail address aaa@xxx.ne.jp for user_A.

A mail presence notice (MPN) is data including data for identifying an e-mail which the server apparatus 20 receives. In the MPN, there is included an ID number which is a specific code of the e-mail and a later described OK code.

In the present embodiment a MPN is sent by a routine of processing an e-mail, and it may be also sent by a short mail in SMS (short message service) based on a user phone number. In this case, when data can be encoded regardless of presence of an OK code, it will be judged that MPN can be received.

Step d:

If the communication processing unit 101 of the mobile phone 10 receives the above MPN, the control unit 109 error-corrects the data, decodes the same, and checks the data included in the MPN. The decoded MPN includes a ID number of a e-mail and a later described OK code, and may include a sender/receiver and a subject of the e-mail.

In the present embodiment, the control unit 109 extracts at least the ID number and the OK code of the e-mail included in the decoded MPN.

The OK code is a code for identifying that reception is properly completed. It is stored on a predetermined location in the MPN. If the control unit 109 can extract the OK code, it recognizes that the reception of the MPN has properly completed.

Note that any operation other than the extraction of the OK code may be applied as far as the control unit 109 can recognize completion of reception.

When recognizing that reception of the header data is properly completed, the control unit 109 controls the display unit 105 so that it displays an icon, in order that a user may recognize the new e-mail reception by the server apparatus 20.

Figure 7:
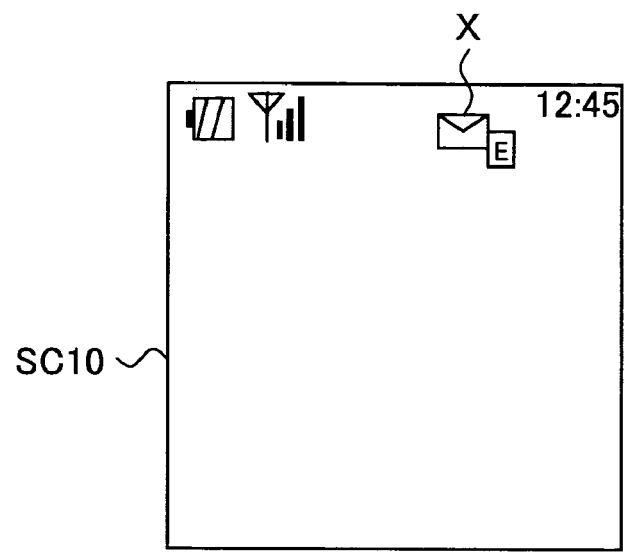
FIG. 7 is a view for describing a display operation of a mobile phone according to the present embodiment.
Figure 7:
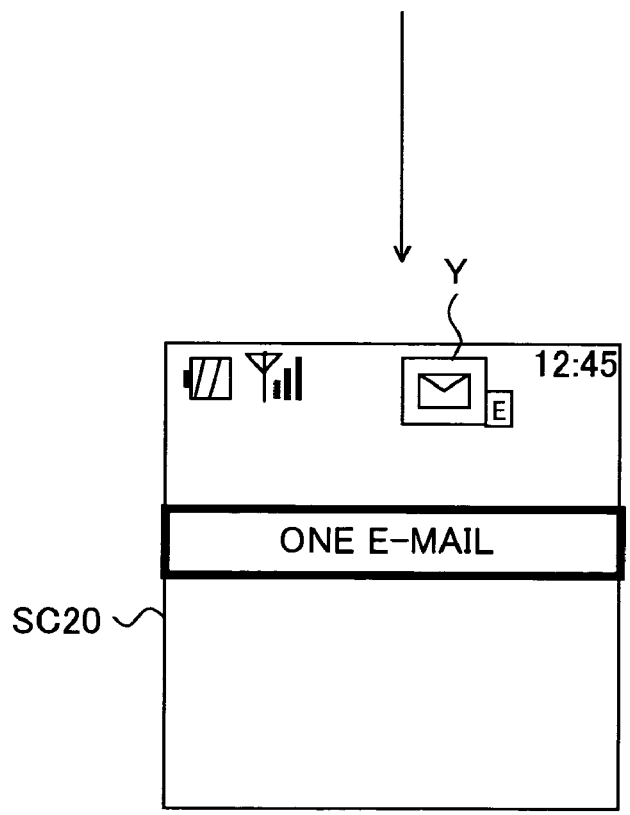

Screen SC10 shown in FIG. 7 shows, as an example of such icon, icon X in order that a user may recognize that the server apparatus 20 receives an own e-mail. In this way, since the icon X is displayed on the top of the display unit 105, the user can recognize that the server apparatus 20 receives the e-mail.

Step e:

Recognizing in the above step d that the reception of the MPN has properly completed, the control unit 109 controls the communication processing unit 101 so that it sends a request for header data to the server apparatus 20 in response to a predetermined operation to the input unit 104 by a user.

Concretely, the communication processing unit 101 sends user identification data or a mail address and mail ID to the server apparatus 20. At this time, if mail IDs of mails which have not been received remains in the communication status list (CSL), the communication processing unit 101 sends the mail IDs.

Step f:

The control unit 109 rewrites the CSL in the flash ROM 103 based on the MPN which is received and decoded in the step c and d.

Concretely, the control unit 109 accesses to the RAM 102, checks the user identification data in the SIM card 108 attached to the mobile phone 10 and, as shown in FIG. 2, stores the mail IDs which are included in the MPN in the flash ROM 103, in association with the user identification data.

Note that, if the mail ID corresponding to the user identification data is present, the CSL will not be rewritten. That is, the oldest mail ID of which mail is not received should remain in the CSL.

Step g:

When the server apparatus 20 receives the request for the header data from the mobile phone 10, it searches for all unsent e-mails in the mail management file (MMF) for the corresponding user, based on the user identification data included in the request.

Note that, since the mail ID assigned from the mobile phone 10 should be the oldest mail ID, it will be sufficient that the server apparatus 20 searches for mails of which MPN was sent after the oldest mail ID was created.

Step h:

The server apparatus 20 sends the header data of all unsent e-mails searched in the step g to the mobile phone 10. That is, it sends all header data included in the MMF corresponding to the user as well as header data corresponding to the mail ID included in the MPN which it sent in the step c.

Header data which the server apparatus 20 sends to the mobile phone 10 is comprised of a mail ID, a mail content data, and a later mentioned END code.

The mail content data is comprised of a receiver/sender of an e-mail.

The END code is a code for identifying that reception of the header data is properly completed. It is added at the latest part of the header data, so that the mobile phone 10 recognizes that reception of the header data is properly completed. The END code may be comprised of, for example, a checksum or a CRC code.

Step i:

If the communication processing unit 101 receives the above header data, the control unit 109 error-corrects the data, decodes the same, and extracts the mail content data in the header data.

Then, if the END code of the header data is properly authenticated, the control unit 109 judges that the header data is properly received, and stores the header data in a predetermined-reception folder of the flash ROM 103.

The control unit 109 controls the display unit 105 so that it changes the display of the icon X and displays a text "One e-mail" to make the user recognize that one unread e-mail is stored in the reception folder.

Screen SC20 shown in FIG. 7 shows, as an example, icon Y which is displayed to make the user recognize that the server apparatus 20 receives the e-mail. In this way, since the icon Y is displayed instead of the icon X on the top of the display unit 105, the user recognizes that the e-mail to the user is stored in the reception folder and confirmation of the sender of the e-mail is possible.

Further, the control 109 rewrites the communication status list (CSL) in the flash ROM 103.

Concretely, the control 109 accesses to the RAM 102, checks the user identification data of the SIM card 108 attached to the mobile phone 10, and deletes the mail ID of which mail is received in the CSL in the flash ROM 103.

Step j:

When the control unit 109 judges that the header data is properly received by properly recognizing the END code, it sends a predetermined response signal (ACK signal) to the server apparatus 20.

Note that, judging that the header data is properly received, communication processing unit 101 may automatically control the communication processing unit 101 so that it sends a request for text data (a subject of the e-mail, a text, an END code, etc.) which follows after the header data.

It is selectable whether the mobile phone 10 according to the present embodiment sends a request for text data of an e-mail assigned by a user operation, or automatically sends a request for the text data for the header data which it receives in the step h, if the user assigns a setting of the control unit by operating a sub-menu for mail reception in advance. In the latter case, the mobile phone 10 sends, together with the user identification data, the mail ID of the mail of which text data is requested to the server apparatus 20.

In response to the selection by the user, an automatic reception flag ("1": Perform automatic reception, "0": Not perform automatic reception) may be set for example. Then, the control unit 109 decides whether it automatically sends a request for text data to the server apparatus 20 according to the setting of the automatic reception flag.

Step k:

When the server apparatus 20 receives the ACK signal from the mobile phone 10, it judges that the header data of the e-mail was properly received by the mobile phone 10 and writes data indicating header transmission completion (HTC) on the mail management files (MMF) for the users corresponding to all e-mails which it sent in the step h.

Note that, if text data was requested in the step j, the server apparatus sends the text data (a subject of the e-mail, a text, an END code, etc.) of the corresponding mail ID to the mobile phone 10. After this, when the mobile phone 10 confirms completion of the reception of the text data, it sends an ACK signal to the server apparatus 20 on the same manner as the step h. This allows the user to read details of the e-mail.

The operation of the mobile phone 10 for receiving e-mails for the mobile phone 30 via the server apparatus 20 has been explained above in association with FIG. 5.

It does not make any problem if the mobile phone 10 receives e-mails according to the above e-mail reception operation. However, it might happen in reality that communication cannot be performed properly between the mobile phone 10 and the server apparatus 20, depending on communication traffic and unstable condition, etc. For example, communication cannot be performed properly in the case in which, a request from the mobile phone 10 to the sever apparatus 20 fails in the above step e, or transmission of header data form the server apparatus 20 to the mobile phone 10 fails in the above step h.

In such case, the SIM card 108 for user_A can be exchanged, for example, to that for user_B, just after the communication fails between the mobile phone 10 and the server apparatus 20, for example, just after the request from the mobile phone 10 to the sever apparatus 20 fails in the above step e. If the request for the header data for user A is reset in the above case, re-attachment of the SIM card 108 for user_A would not allow the mobile phone 10 to receive the header data for a while until the server apparatus 20 receives the another e-mail for user_A. Note that, when the request for the header data is reset, the mobile phone 10 never sends the request automatically.

If the request for the header data for user A is not reset in the above case, user_B could send the unintended request for the header data for user_A. This makes the server apparatus 20 recognize that user_B requests header data of mails for user A. At this time, the server apparatus 20 generates an error. Further, if the request for the header data for user A is not reset in the above case, user_B could not receive own header data.

The mobile phone 10 according to the present embodiment does not make the above problem, even if communication cannot be performed properly between the mobile phone 10 and the server apparatus 20.

That is, the mobile phone 10 according to the present embodiment, in the above step f, stores mail ID included in a mail presence notice (MPN) which it receives in a communication status list (CSL) of the flash ROM 103, and, in the step i after receiving text data, deletes mail ID corresponding to user identification data from the CSL. Therefore, once the mobile phone 10 receives the MPN (step d), it will not be deleted as long as header data reception is not completed. That is, even if communication in the step e and h is not performed properly, the mail ID will not be deleted from the CSL.

Consequently, in the above case, that is, in the case in which the SIM card 108 for user_A is exchanged to that for user_B, the CSL recognizes by the CSL that the reception of the header data for user_A is not completed. Then, when the SIM card for user_A is attached afterwards, it becomes possible that the control unit 109 generates a request for the header data for user_A based on the CSL.

Next, as explained below, the mobile phone 10 according to the present invention may utilize further a communication status list (CSL) for each user.

Figure 8:
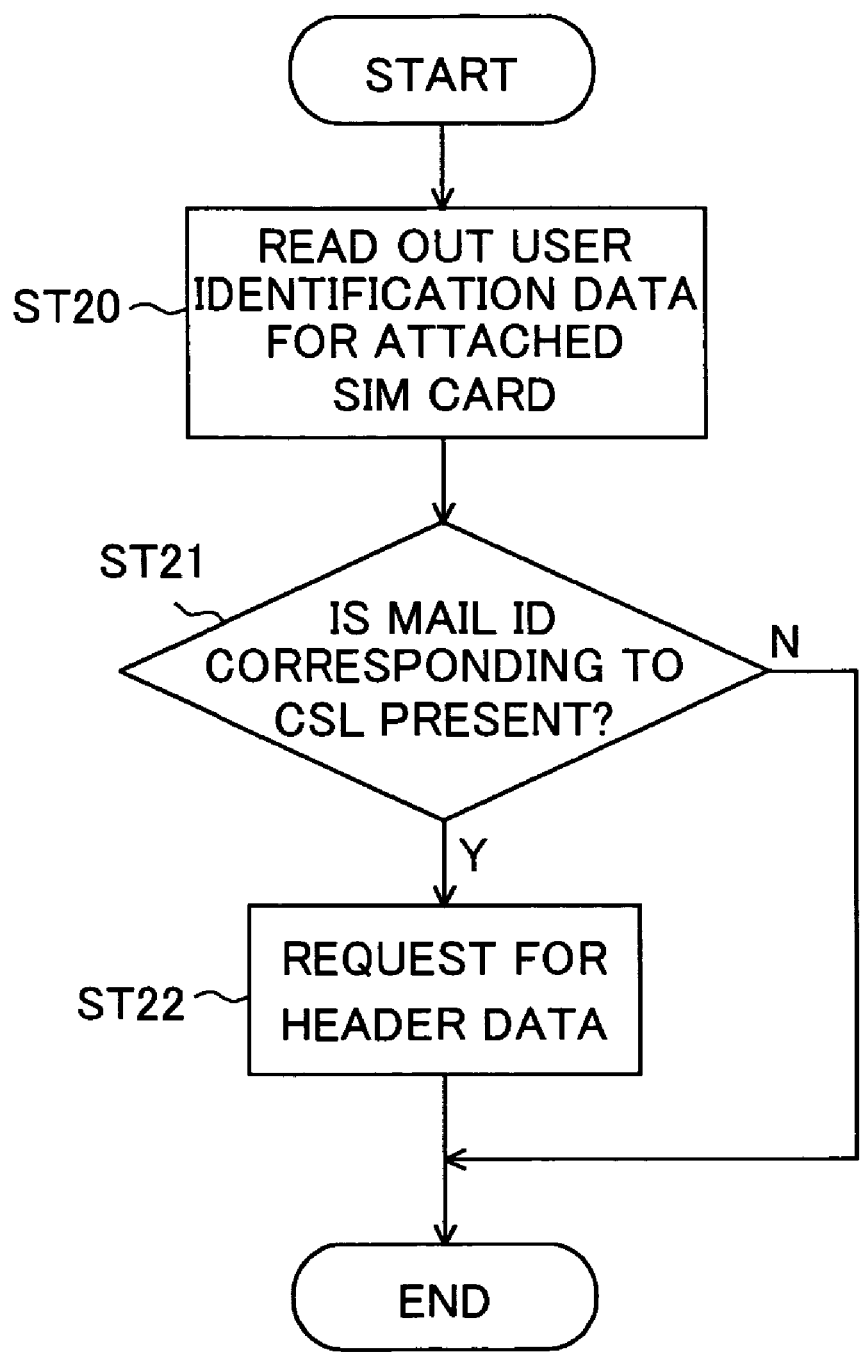
FIG. 8 is a view for describing an operation of a mobile phone according to the present embodiment.

FIG. 8 is a flowchart for describing an operation for a request for header data based on CSL. That is, the operations after the step d in FIG. 5 may be started at the timing shown in FIG. 8.

As shown in FIG. 8, the control unit 109 reads out user identification data in the attached SIM card 108 from the RAM 102 or the SIM card 108 (step ST20). If mail ID corresponding to the user identification data is present in the CSL, that is, header data which was not received in attaching the SIM card 108 before, because of communication failure, etc., is present, the mobile phone 10 sends a request for the header data (step ST22).

A time to start the flowchart shown in FIG. 8 may be the time when the mobile phone 10 recognizes an exchange of the SIM card 108, or in an initial processing period at a power startup, or the time when the mobile phone 10 receive a MPN.

Since the mobile phone 10 according to the present embodiment is designed so that it switches off a power when the SIM card 108 is detached, it is sufficient that the flowchart starts in the initial processing period at a power startup. Then, a processing shown in FIG. 8 will be executed in the exchange of the SIM card 108.

As explained above, the mobile phone 10 according to the present embodiment has the communication processing unit 101, the non-volatile flash ROM 103, the key input unit 104, the display unit 105, the SIM card interface unit 107, the SIM card 108 and the control unit 109. The flash ROM 103 memorizes a communication status list (CSL), that is, data which relates mail ID of mails which the server apparatus 20 connected to a network has received and the mobile phone 10 has not yet received, to the corresponding user identification data. If the control unit 109 receives a mail presence notice (MPN) including mail ID form the server apparatus 20, it stores the mail ID in the CSL in association with the user identification data. Then, the control unit 109 controls the communication processing unit 101 so that it sends a request for header data. When receiving the header data, the control unit 109 deletes the corresponding mail ID from the CSL. Moreover, the control unit 109 accesses to the CSL, and controls the communication processing unit 101 so that it sends a request for a header part of an e-mail to the server apparatus 20.

Therefore, even if the SIM card 108 for user_A is exchanged, for example, to that for user_B after communication fails between the mobile phone 10 and the server apparatus 20, the mobile phone 10 recognizes by the CSL that the reception of the header data for user_A is not completed. Then, when the SIM card for user_A is attached afterwards, a request for the header data for user_A is sent based on the CSL. Therefore, it becomes possible to receive the e-mail in the server apparatus 20 on a timely manner.

Since the CSL has mail ID for respective user identification data included in the SIM card 108, it becomes possible to recognize a reception status of e-mails for the respective user in sharing a mobile phone among a plurality of users.

The above embodiment is not to limit the present invention, and a variety of modification will be possible.

Figure 9:
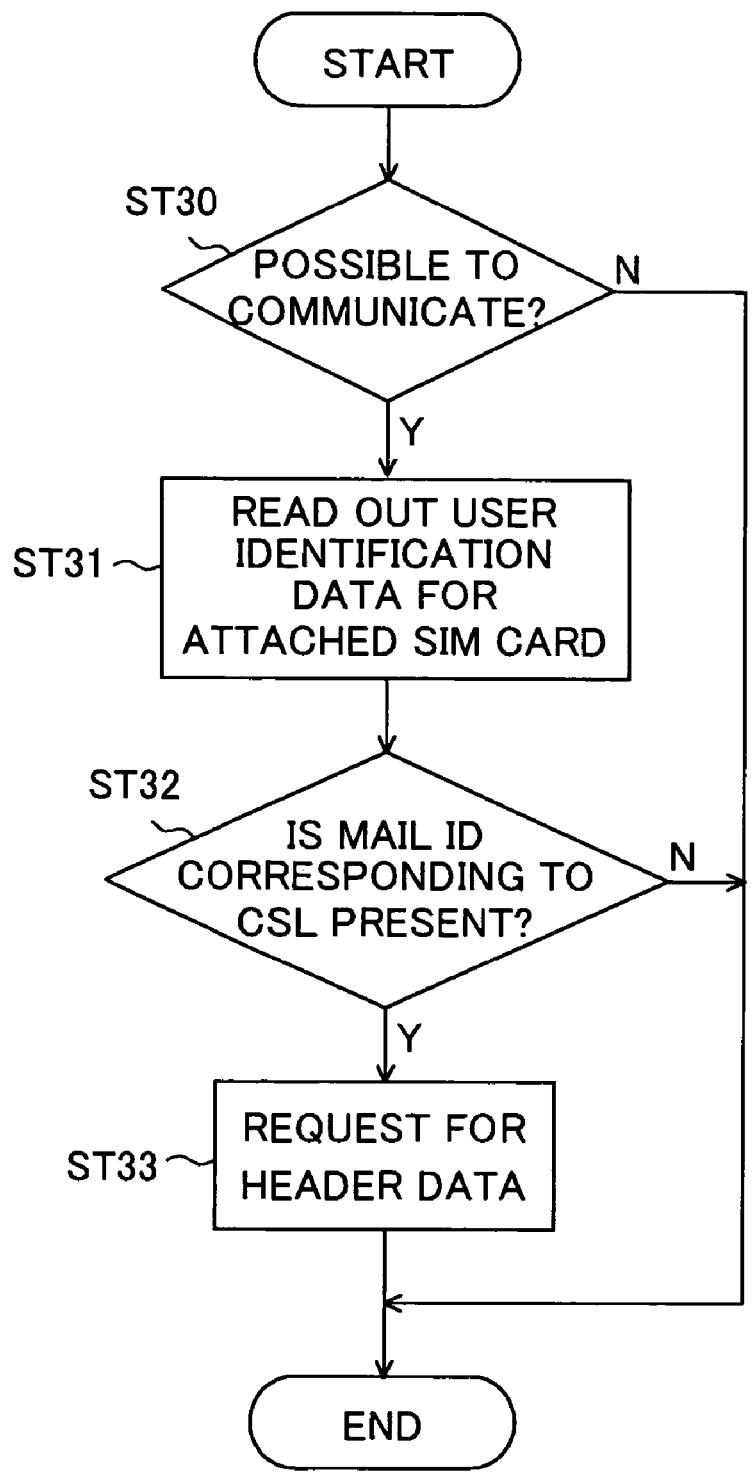
FIG. 9 is a view for describing an operation of a mobile phone according to the present embodiment.

For example, a flowchart in FIG. 9 is an example of a processing including timing to start the processing shown in FIG. 8, which is different from FIG. 8 in adding a step ST30. That is, according to the flowchart in FIG. 9, when the communication processing unit 101 of the mobile phone 10 becomes possible to communicate, the processing shown in FIG. 8 is started.

Due to this, even if the mobile phone 10 is designed so that the processing in FIG. 8 is performed in an initial processing at a power startup, and, a user is located, at a power startup, in an area where the communication processing unit 101 cannot communicate and perform the processing in FIG. 8, then the mobile phone 10 can send a request for header data immediately after the user moves to an area where the communication processing unit 101 can communicate.

What is claimed is:

1. A mobile communication terminal, attachably/detachably mounting a recording media recording a user identification information, and receiving a communication data for a user specified by the user identification information stored in the recording media, said mobile communication terminal comprising:

a wireless communication means for wirelessly connecting to a communication network, receiving an ID information of a communication data when recognizing the existence of the communication data for the user corresponding to the user identification information in the mounted recording media, carrying out a sending request for the communication data by using the ID information, and receiving the communication data responsive to the sending request;

a storage means for storing the ID information, as a not-received data, indicating that the reception is not completed, while corresponding to the user identification information in the mounted recording media, until the reception of the communication data corresponding to the received ID information is completed; and a control means for controlling the wireless communication means so that, when a recording media is exchanged, the control means refers data stored in the exchanged recording media, checks the storage of an ID information for the not-received communication corresponding to a user identification information in the newly mounted recording media, and controls the wireless communication means so as to issue a sending request for a communication request using the ID information, said control means making the completion of the reception for the communication responsive to the sending request, and deleting the ID information corresponding to the communication which completed the reception.

2. The mobile communication terminal according to claim 1, wherein the control means refers the data in the recording media when the status of the wireless communication means is switched over from a zone of out-of communication service to another communicable tone, and confirms that whether or not the not-received data is stored in the storage means, corresponding to the user identification information in the mounted recording media.

3. The mobile communication terminal according to claim 1, wherein the control means refers the data in the recording media when received an ID information for a new communication data, and confirms that whether or not the not-received data is stored in the storage means, corresponding to the user identification information in the mounted recording media.

4. The mobile communication terminal according to claim 1, wherein the control means deletes the ID information corresponding to the not-received data from the storage means storing the ID information, when receiving the ID information for the new communication data, and receiving the corresponding communication data, and further receiving the communication data corresponding to the ID information indicating the not-received data, stored in the storage means, in addition to the communication data corresponding to the ID information.

5. The mobile communication terminal according to claim 1, wherein the control means does not further store a new ID information and a new not-received data in the storage means, when receiving the ID information for the new communication data, if there is the ID information already stored in the storage means, for indicating other not-received data, or the reception of the communication data on the basis of the newly received ID information.

6. The mobile communication terminal according to claim 1, said terminal further comprising a display means,
wherein the control means, when received an ID information for a new communication data, displays a first icon to the display means on the basis of the ID information until the completion of the communication data, and displays a second icon different to the first icon to the display means upon completion of the reception of the communication data.

7. A mobile communication terminal, attachably/detachably mounting a recording media recording a user identification information, and receiving a communication data for a user specified by the user identification information stored in the recording media,
said mobile communication terminal comprising:
a wireless communication means for
wirelessly connecting to a communication network, receiving an ID information of a communication data when recognizing the existence of the communication data for the user corresponding to the user identification information in the mounted recording media,
carrying out a sending request for the communication data by using the ID information, and
receiving the communication data responsive to the sending request;
a storage means for storing the ID information, as a not-received data, indicating that the reception is not completed, while corresponding to the user identification information in the mounted recording media, until the reception of the communication data corresponding to the received ID information is completed; and
a control means for controlling the wireless communication means so that, when a power of said mobile communication terminal is turned on and the terminal is started, the control means refers data stored in the exchanged recording media, checks the storage of an ID information for the not-received communication corresponding to a user identification information in the newly mounted recording media, and controls the wireless communication means so as to issue a sending request for a communication request using the ID information,
said control means
making the completion of the reception for the communication responsive to the sending request, and
deleting the ID information corresponding to the communication which completed the reception.

8. The mobile communication terminal according to claim 7, wherein the control means refers the data in the recording media when the status of the wireless communication means is switched over from a zone of out-of communication service to another communicable tone, and confirms that whether or not the not-received data is stored in the storage means, corresponding to the user identification information in the mounted recording media.

9. The mobile communication terminal according to claim 7, wherein the control means refers the data in the recording media when received an ID information for a new communication data, and confirms that whether or not the not-received data is stored in the storage means, corresponding to the user identification information in the mounted recording media.

10. The mobile communication terminal according to claim 7, wherein the control means deletes the ID information corresponding to the not-received data from the storage means storing the ID information, when receiving the ID information for the new communication data, and receiving the corresponding communication data, and further receiving the communication data corresponding to the ID information indicating the not-received data, stored in the storage means, in addition to the communication data corresponding to the ID information.

11. The mobile communication terminal according to claim 7, wherein the control means does not further store a new ID information and a new not-received data in the storage means, when receiving the ID information for the new communication data, if there is the ID information already stored in the storage means, for indicating other not-received data, or the reception of the communication data on the basis of the newly received ID information.

12. The mobile communication terminal according to claim 7, said terminal further comprising a display means,
wherein the control means, when received an ID information for a new communication data, displays a first icon to the display means on the basis of the ID information until the completion of the communication data, and displays a second icon different to the first icon to the display means upon completion of the reception of the communication data.

* * * * *